(12) United States Patent  
Vincent et al.

(10) Patent No.: US 7,969,110 B2
(45) Date of Patent: Jun. 28, 2011

(54) COMPENSATION ACTUATOR FOR A ROTORCRAFT FLIGHT CONTROL

(75) Inventors: Philippe Vincent, Aix En Provence (FR); Sébastien Pellegrino, Marseilles (FR); Bernard Gemmati, Lauris (FR)

(73) Assignee: Eurocopter, Marignane Codex (FR)

( * ) Notice: Subject to any disclaimer, the term of this patent is extended or adjusted under 35 U.S.C. 154(b) by 450 days.

(21) Appl. No.: 12/206,486

(22) Filed: Sep. 8, 2008

(65) Prior Publication Data

US 2009/0065648 A1     Mar. 12, 2009

(30) Foreign Application Priority Data

Sep. 7, 2007 (FR) ...................................... 07 06266

(51) Int. Cl.
*H02P 7/00* (2006.01)

(52) U.S. Cl. ....... 318/460; 318/632; 318/655; 244/75.1; 244/76 R; 244/175; 244/177; 244/178

(58) Field of Classification Search .................. 318/460, 318/632, 655; 244/75.1, 76 R, 175, 177, 244/178

See application file for complete search history.

(56) References Cited

U.S. PATENT DOCUMENTS

| | | | | |
|---|---|---|---|---|
| 2,479,549 A | * | 8/1949 | Ayres et al. | 244/17.13 |
| 3,021,097 A | * | 2/1962 | Hecht | 244/197 |
| 3,043,539 A | * | 7/1962 | Bishop | 244/76 R |
| 3,099,421 A | | 7/1963 | Gerstine | |
| 3,369,161 A | * | 2/1968 | Kaufman | 318/566 |
| 3,750,984 A | | 8/1973 | Mouttet et al. | |
| 4,345,195 A | | 8/1982 | Griffith et al. | |
| 4,607,202 A | * | 8/1986 | Koenig | 318/628 |
| 5,059,882 A | | 10/1991 | Marcillat et al. | |
| 5,125,602 A | * | 6/1992 | Vauvelle | 244/223 |
| 5,522,568 A | | 6/1996 | Kamen et al. | |
| 6,325,331 B1 | * | 12/2001 | McKeown | 244/76 A |
| 6,400,109 B1 | * | 6/2002 | Helmut | 318/400.11 |
| 6,512,344 B1 | * | 1/2003 | Konno et al. | 318/560 |
| 7,108,232 B2 | * | 9/2006 | Hoh | 244/223 |

FOREIGN PATENT DOCUMENTS

FR    2 718 102 A    10/1995

OTHER PUBLICATIONS

French Search Report dated Apr. 30, 2008.

* cited by examiner

*Primary Examiner* — Walter Benson
*Assistant Examiner* — Kawing Chan
(74) *Attorney, Agent, or Firm* — Brooks Kushman P.C.

(57) ABSTRACT

The invention relates to an actuator having an (auto)synchronous rotary electric motor and a reversible speed-reducing gearbox coupled to the motor to be driven in rotation thereby An outlet shaft is coupled to the speed-reducing gearbox to be driven in rotation thereby A first angular position sensor and a control circuit are connected to the motor. The circuit delivers a motor power supply signal that varies as a function of a position setpoint signal applied to the control circuit and as a function of signals delivered by the angular position sensor. The gearbox has a plurality of speed-reducing each having a pair of gears mounted to rotate about two parallel axes of rotation.

11 Claims, 4 Drawing Sheets

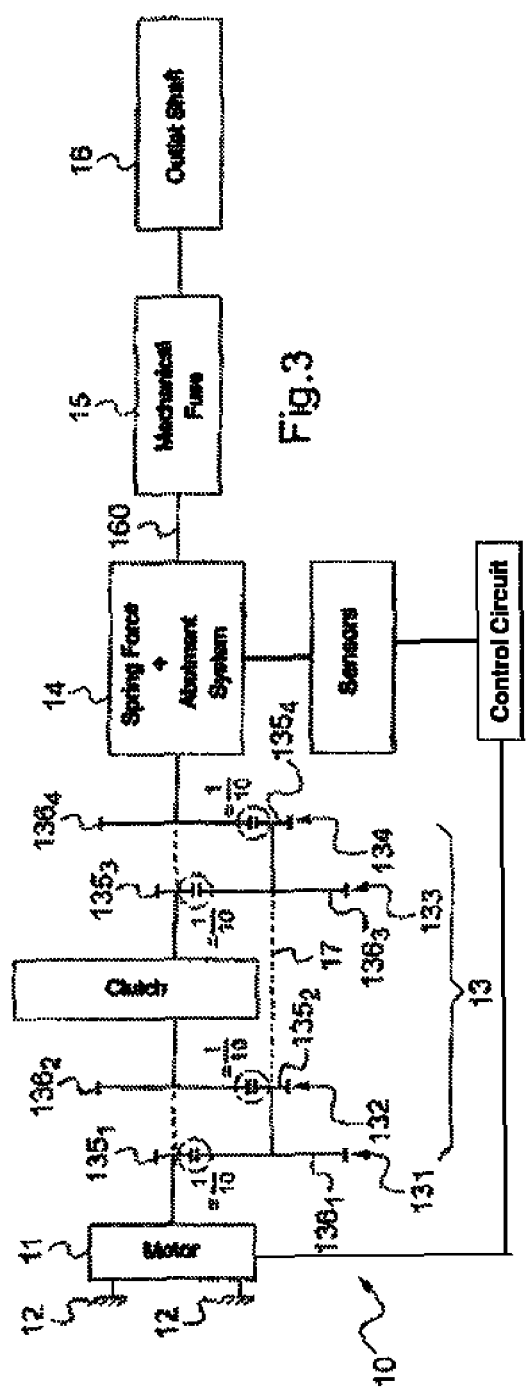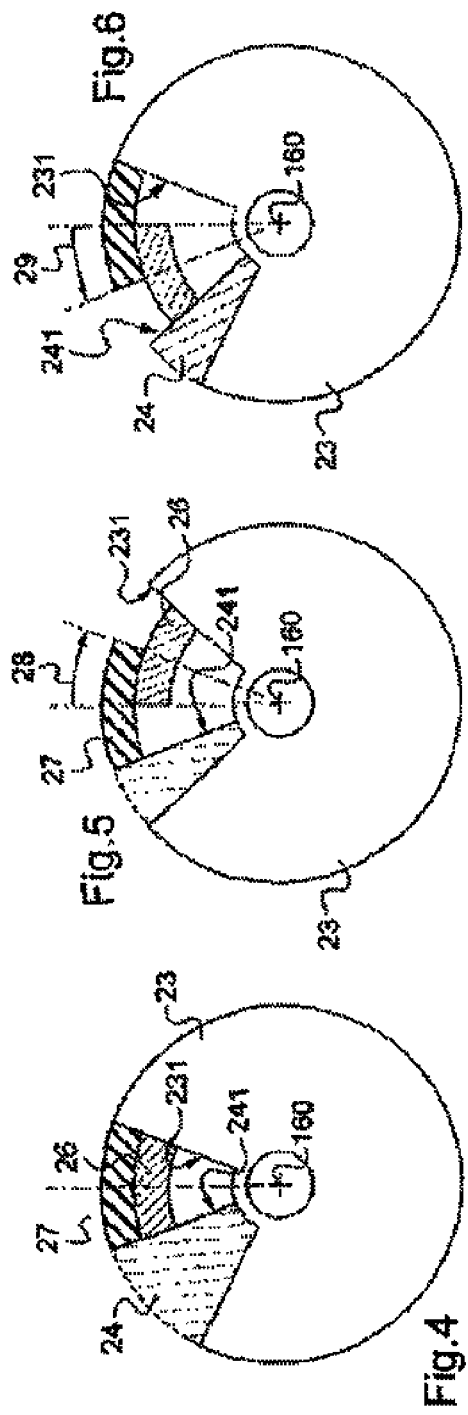

COMPENSATION ACTUATOR FOR A ROTORCRAFT FLIGHT CONTROL

The present invention relates to an electric compensation actuator for actuating the flight controls of a rotorcraft.

BACKGROUND OF THE INVENTION

On board a rotorcraft, an autopilot ("AP") transmits command signals or data to electric actuators that are connected in series in the flight controls. A compensation actuator is also fitted to the flight controls, and in particular in the pitch control system and in the roll control system in order to move the anchor point (or "midpoint") of the manual control ("cyclic stick" in particular) that is made available to a human pilot.

Such a compensation actuator, also referred to as a "trim" actuator or as a "parallel" actuator is also controlled by signals delivered by a computer of the AP. Together these actuators serve to control variation in the position of an aerodynamic surface (or member), such as a rotor blade or an aileron, as a function of a position setpoint signal for that surface, while also enabling the human pilot to keep control over the flight controls.

The invention applies in particular to a compensation actuator including an electric motor driving an outlet shaft via a speed-reducing gearbox.

Patent FR-A-2 718 102 describes such a compensation actuator in which the gearbox is reversible, in which the motor is autosynchronous, and that includes a sensor responsive to the angular position of the outlet shaft, a sensor responsive to the angular position of the motor shaft, and an electronic control device that receives signals from said sensors and that applies electric currents to the motor suitable for obtaining a torque that corresponds to a force opposing the movement of a flight control lever.

As stated in that patent, it is also known to make a "trim" actuator in which the transmission comprises, in succession and coupled in this order between the motor and the outlet shaft: an irreversible gearbox; a clutch; a viscous damper; a second gearbox; a spring box; and a safety device.

OBJECTS AND SUMMARY OF THE INVENTION

An object of the invention is to propose a compensation actuator for flight controls, the actuator presenting increased compactness, robustness, simplicity, and maintainability.

An object of the invention is to propose such a compensation actuator or servo-motor for flight controls that is improved and/or that remedies, at least in part, the shortcomings or drawbacks of known compensation actuators and servo-motors.

The invention thus applies to an actuator comprising:
an (auto)synchronous rotary electric motor;
a reversible speed-reducing gearbox coupled to the motor to be driven in rotation thereby;
an outlet shaft coupled to the speed-reducing gearbox to be driven in rotation thereby;
a first angular position sensor responsive to the angular position of the outlet shaft; and
a control circuit connected to the angular position sensor and to the motor, said circuit delivering a motor power supply signal that varies as a function of a position setpoint signal applied to the control circuit and as a function of signals delivered by the angular position sensor.

In accordance with an aspect of the invention, the gearbox comprises a plurality of speed-reducing modules or stages each comprising a pair of gears (in particular three or four stages); the gears are mounted to rotate on two mutually parallel axes of rotation, preferably about only two mutually parallel axes of rotation, one of which coincides substantially with the axis of rotation of the outlet shaft.

In an embodiment, one of the two axes of rotation coincides substantially with the axis of rotation of the motor, while the other coincides substantially with the axis of rotation of the outlet shaft.

Preferably, at least two speed-reducing modules or stages present an identical reduction ratio, and in particular three or four stages present an identical speed reduction ratio.

In a preferred embodiment, the value of this reduction ratio is close to ten.

According to another aspect of the invention, the actuator comprises a member responsive to the opposing torque transmitted by the outlet shaft, said member being interposed between—and coupled to rotate with—the outlet shaft and the gearbox. Said member comprises a structure that is deformable in twisting, two sensors that are responsive to angular position and that are disposed at opposite ends of the structure that is deformable in twisting, and a circuit connected to the two angular position sensors and arranged to determine an opposing torque value as a function of the signals delivered by the two sensors and as a function of the twisting stiffness of the deformable structure.

The structure that is deformable in twisting may comprise a helical spring, two parallel plates connected to the ends of the spring, and two abutments connecting respective ones of the plates, and the spring, firstly to the gearbox and secondly to the outlet shaft.

Preferably, the two angular position sensors are magnetic sensors and they include said angular position sensor that is responsive to the angular position of the outlet shaft.

Also preferably, the or each angular position sensor includes all or part of a (rotary) ring that is magnetized in non-uniform manner, together with a (stationary) sensor responsive to variations in the magnetization of the magnetized ring.

Also preferably, each magnetized ring comprises one or more circular or circularly arcuate tracks that are concentric, each having several tens of north poles alternating with south poles; in particular, the ring has two angularly-offset tracks, and the sensor responsive to variations in the magnetization of the magnetized ring is a Hall effect sensor.

According to other preferred characteristics of the invention:
the actuator may include a weakened structure forming a mechanical "fuse" for interrupting torque transmission between the outlet shaft and the motor when the opposing torque reaches a determined value; the weakened structure may be in the form of a pin interconnecting two shaft portions; it is preferably interposed between the angular position sensor of the outlet shaft and, the structure that is deformable in twisting;
the (auto)synchronous motor may include a rotary cage—or a rotary stator;
the actuator may include an electromagnetic brake that may be incorporated in part in the motor; and
the actuator may include an electromagnetic clutch operating on eddy currents or with powder, that may be interposed between the structure that is deformable in twisting and the gearbox; alternatively, the clutch may be interposed between two stages of the gearbox, or in association with the motor.

Thus, the motor comprising a rotor cage, it is interesting to provide the actuator with a brake lining and with an electromagnetic field winding which is able to engage or disengage said brake lining against the rotary cage.

The brake lining being secured to the actuator casing, said brake lining anchors temporary the rotary cage to the casing by minimizing the presence of a gap in the kinematic linkage.

The invention makes it possible to provide a compensation actuator for flight controls that is compact, robust, simple, and easy to maintain.

Other aspects, characteristics, and advantages of the invention appear from the following description which refers to the accompanying drawings that show preferred embodiments of the invention without any limiting character.

In the present application, unless stated explicitly or implicitly to the contrary, the terms "signal" and "data" are equivalent.

BRIEF DESCRIPTION OF THE DRAWINGS

FIG. 3 is a diagrammatic view of the transmission of the actuator of FIGS. 1 and 2.

FIGS. 4 to 6 are diagrammatic views of a spring system for applying a torque that opposes the force applied by a human pilot on a control stick connected to the compensation actuator:

FIG. 4 corresponds to a configuration in which the toque produced by the spring is zero;

FIG. 5 corresponds to a configuration in which the torque produced by the spring is not zero and is directed in a first direction; and FIG. 6 corresponds to a configuration in which the torque produced by the spring is not zero and is directed in a second direction, opposite to the first direction.

MORE DETAILED DESCRIPTION

Figure 1:
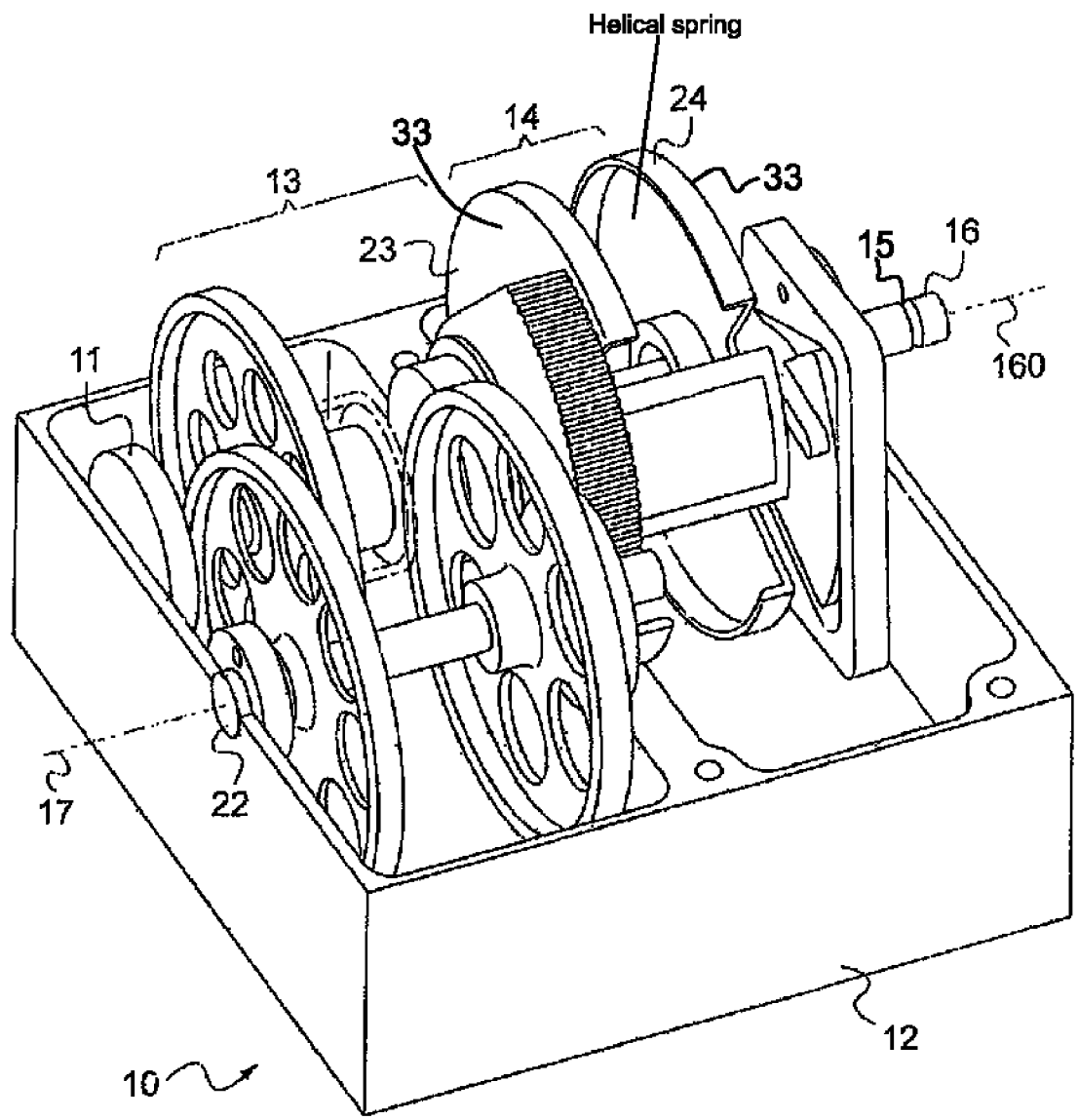
FIG. 1 is a diagrammatic perspective view of an actuator of the invention, showing the main components of an embodiment.
Figure 2:
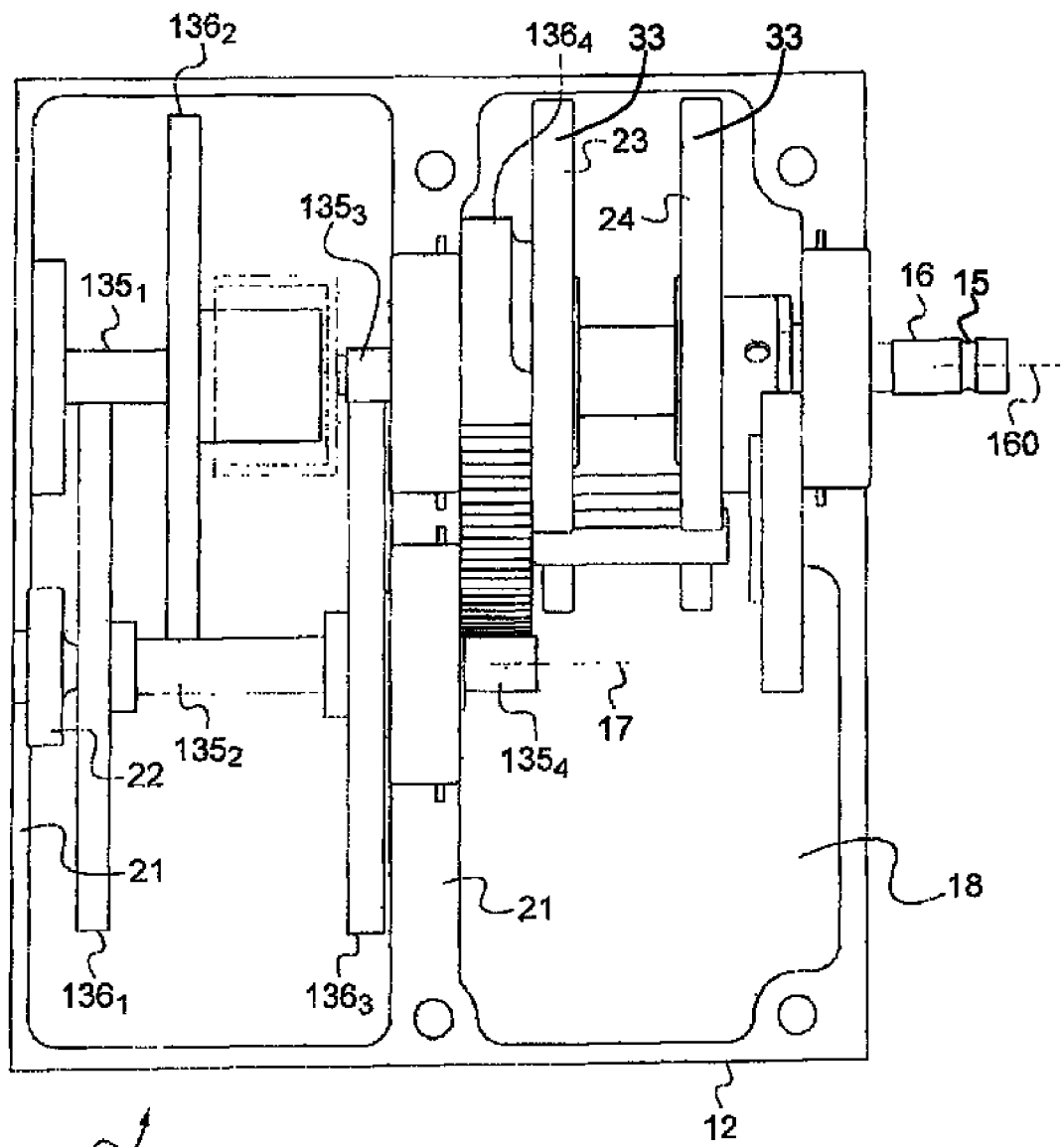
FIG. 2 is a diagrammatic plan view of the FIG. 1 actuator.

With reference to FIGS. 1 to 3 in particular, the actuator 10 comprises a casing 12 receiving an auto-synchronous motor 11 with a rotary cage, a speed-reducing gearbox 13 driven by the motor, a spring system 14 driven by the gearbox 13, an opposing torque limiter 15 driven by the spring system and driving the outlet shaft 16 of the actuator.

In an embodiment, the amplitude of the rotary movement of the shaft 16 may lie in a range going from about −40° to about +40°, relative to a midpoint.

The actuator also includes an electronic circuit, for as shown in FIG. 3 for powering the motor 11 and for servo-controlling the position of the outlet shaft of the actuator.

The gearbox comprises four stages 131 to 134 each comprising a driving gear 1351, 1352, 1353, 1354 having a small number of teeth, and a driven gear 1361, 1362, 1363; 1364 meshing with the driving gear and presenting a number of teeth that is greater than that of the driving gear.

The first three stages (1351, 1361), (1352, 1362), and (1353, 1363) present the same reduction ratio which is close to ten, as does the fourth stage (1354, 1364).

In FIGS. 1 and 2, it can be seen that the gears 1351, 1362, 1353, 1364 are mounted to rotate relative to the casing 12 about an axis that coincides with the common axis of rotation 160 of the shaft 16 and of the motor 11, while the gears 1361, 1352, 1363, 1354 are mounted to rotate relative to the casing 12 about an axis 17 parallel to the axis 160.

The gears 1351, 1352, 1353, 1354, 1361, 1362, 1363, 1364 present straight teeth.

Figure 8:
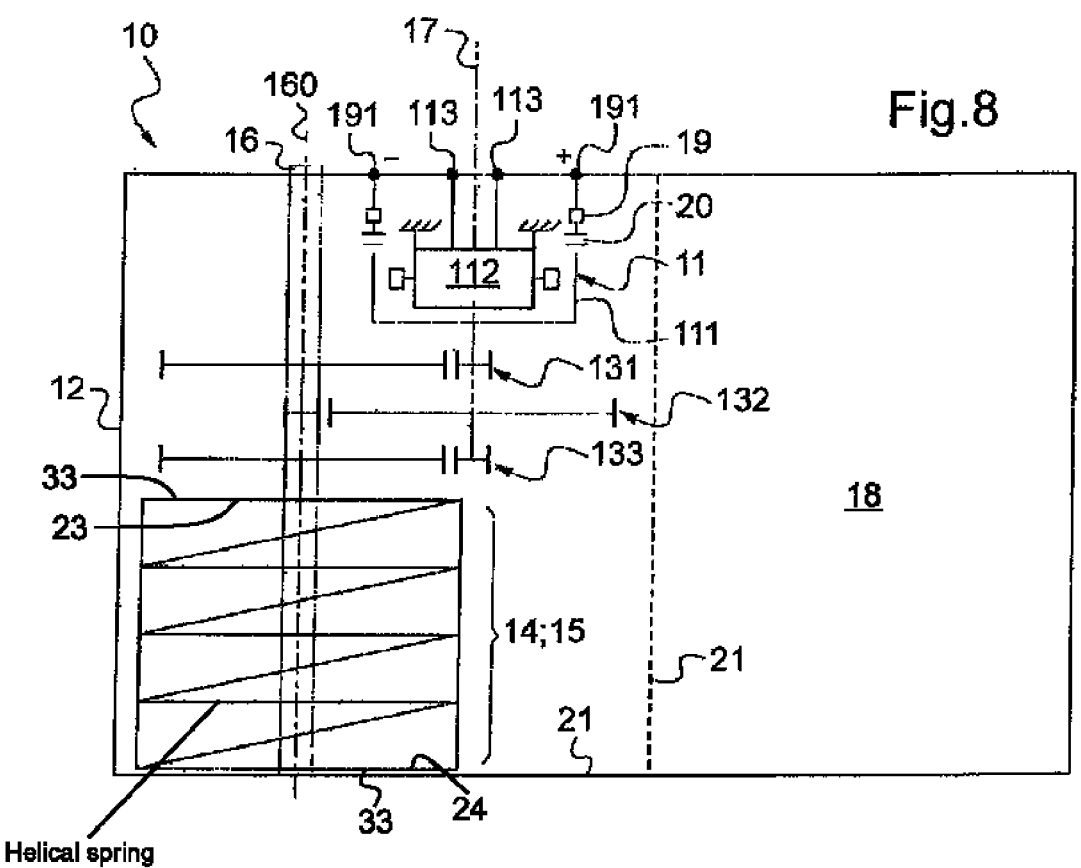
FIG. 8 is a diagrammatic view of the transmission of an actuator in a second embodiment of the invention.

In the embodiment corresponding to FIG. 8, the gearbox 13 has only three stages 131 to 133, with some of its gears mounted to rotate about the axis of rotation 160 of the outlet shaft 16 and its other gears mounted to rotate about the axis of rotation 17 of the motor 11.

In this embodiment, the motor 11 has an outer rotary cage 111 and a stationary field winding 112 connected by terminals 113 to a motor control circuit.

The actuator also includes a temporary coupling means of the motor's rotary cage 111 to the casing 12. For example, this coupling mean comprises a second electromagnetic field winding 19 that can be powered via terminals 191 to engage, or on the contrary to disengage, a movable brake lining 20 relative to the rotary cage 111 of the motor 11, thereby providing an anchor function (by preventing the cage 111 from rotating).

In both embodiments, the casing 12 defines a housing 18 that receives the motor control circuit.

The control circuit is connected to a sensor responsive to the angular position of the outlet shaft, said circuit delivering a power supply signal to the motor that varies as a function of a position setpoint signal applied to the control circuit by a computer of the AP, and as a function of the signals delivered by the angular position sensor.

The design of the casing 12 with one or more partitions 21 receiving bearings 22 for the shafts of the rotary members (gears in particular) enables all of the elements of the actuator to be mounted in a single casing, and enables it to be closed once the mechanical, electrical, and electronic elements thereof have been assembled and interconnected.

In the embodiment corresponding to FIGS. 1 to 6, the spring system 14 of the actuator is associated with two magnetic sensors that are responsive respectively to the angular positions of two parallel disks/plates 23, 24 having a helical spring about the axis 160 connected thereto so as to form a member (or sensor) that is sensitive to the opposing torque transmitted by the outlet shaft. Indeed, the helical spring is secured to the two plates 23, 24 respectively by his two extreme coils.

The two plates 23, 24 are "floatingly" mounted, i.e. they can move in rotation through a certain range of angular offsets relative to the outlet gear and to the outlet shaft of the actuator.

This torque pickup member is interposed between—and coupled to rotate with—the outlet shaft and the gearbox. This member comprises a structure that is deformable in twisting, two sensors responsive to angular position disposed at either end of the structure that is deformable in twisting, and a circuit connected to the two angular position sensors and arranged to determine a value for the opposing torque as a function of the signals delivered by the two sensors and the stiffness in twisting of the deformable structure (i.e. of the spring).

The structure that is deformable in twisting comprises a helical spring and the two plates 23, 24 connecting the spring to the gearbox and to the outlet shaft via fingers 26, 27.

Preferably, the two angular position sensors are magnetic sensors and include said first angular position sensor that is responsive to the angular position of the outlet shaft.

As shown more particularly in FIGS. 4 to 6, the spring system has a first finger 26 constrained to rotate with the outlet shaft 160 of the gearbox.

The spring system also includes a second finger 27 constrained to rotate with the outlet shaft 16 of the actuator.

Depending on how the actuator is used, the finger 26 serves as a prestress stationary abutment while the finger 27 serves as a force abutment, or else the finger 27 serves as a prestress stationary abutment while the finger 26 serves as a force abutment.

Each of the two abutments 26 and 27 extends along—parallel to—the axis 160 that is common to the system 14 and to the outlet shaft, between the plates 23, 24, each of which is provided with a respective notch 231, 241 against which the fingers can bear.

In the configuration showing in FIG. 4, each of the abutments 26, 27 bears against both notches 231, 241. In this position, the spring is prestressed.

In the configuration shown in FIG. 5, the abutment 26 bears against the notch 231 while the abutment 27 bears against the notch 241. In this position, which corresponds to the two plates 23, 24 being at an angular offset 28 about the axis 160 in a first direction, the twisting/stress in the spring increases. This offset is measured by the two sensors that are responsive to the angular positions of the plates, as described below.

In the configuration shown in FIG. 6, the abutment 26 bears against the notch 241 while the abutment 27 bears against the notch 231. In this position, which corresponds to an angular offset 29 of the two plates 23, 24 about the axis 160, but in the opposite direction to the offset 28 of FIG. 5, the twisting/stress in the spring also increases. This offset is likewise measured by the two sensors responsive to the angular positions of the plates, as described below.

Figure 7:
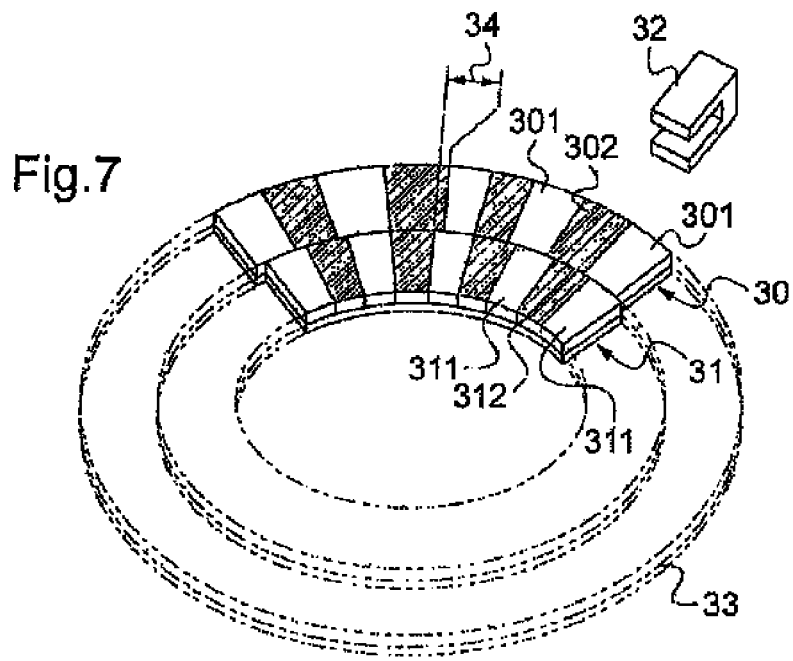
FIG. 7 is a diagrammatic perspective view of a magnetic coder forming part of an angular position sensor of an actuator of the invention.

With reference to FIG. 7 in particular, each angular position sensor includes a magnetized rotary ring 33 together with a stationary sensor 32 that is responsive to variations in the magnetization of the magnetized ring. A respective coded ring 33 or "coder" is connected to rotate with each of the plates 23, 24.

Each magnetized ring 33 has two concentric tracks 30, 31 or circular arcs, each carrying several tens of magnetized sectors, the sectors forming north poles 301, 311 alternating with south poles 302, 312, and the two tracks being mutually offset by an angle 34.

Thus, a coded ring is secured to each plate for example.

This angle-measuring device serves to eliminate the contact detectors that are generally used in a spring system for detecting actuation by the human pilot. This system has the advantage of being compact and of combining the functions of a position sensor and of a force detector. These sensors make it possible to avoid having electric wires connected to moving parts, and the "digital" coding of the angular position measurement is the result of the two polarities of alternating magnetic sectors that make it possible to avoid the hysteresis effect that is inherent to using a plurality of sensors, each having respective hysteresis that needs to be synchronized.

The actuator may include an electromagnetic clutch, based on eddy currents or on powder, that can be interposed between the structure that is deformable in twisting and the gearbox; alternatively, the clutch may be interposed between two stages of the gearbox.

The actuator may include a friction device that is coupled to or integrated with the brushless motor and that is controlled by said control circuit. The reversible speed-reducing transmission serves to cause the outlet shaft to turn under orders from the autopilot.

The spring force system delivers mechanical opposition to the stick that leads to deformation of the spring that is detected by the position sensors. A pin forming a mechanical "fuse" is incorporated in case the system jams. Activating the actuator enables the pilot to let go the controls and allow the autopilot to handle stages of flight selected by the pilot.

The autopilot controls the action of the actuator by powering the motor 11. The motor drives the outlet shaft 16 via the speed-reducing mechanism 13. When the pilot takes over, pilot actions pass through the spring force relationship system 14, and the angular position sensors send information to the autopilot so that, under certain circumstances, it switches off the action of the motor 11.

In the event of the mechanism jamming, the pin breaks so as to leave the outlet shaft free to turn without losing the information concerning the angular position of said shaft.

An angular oscillation damper may incorporated in the motor or in the electromagnetic clutch. When the pilot lets go the controls, the motor or the clutch brake in order to absorb the energy stored in the spring device.

What is claimed is:

1. An actuator comprising:
an auto-synchronous rotary electric motor;
a reversible speed-reducing gearbox coupled to the motor to be driven in rotation thereby;
an outlet shaft coupled to the speed-reducing gearbox to be driven in rotation thereby;
a member responsive to the opposing torque transmitted by the outlet shaft, the member being interposed between and coupled to rotate with the outlet shaft and the speed-reducing gearbox, the member comprising a deformable structure that is deformable by twisting;
two angular position sensors responsive to the angular position of the deformable structure and disposed at opposite ends of the deformable structure, the first angular position sensor responsive to an angular position of the outlet shaft; and
a control circuit connected to the two angular position sensors and to the motor, said circuit delivering a motor power supply signal that varies as a function of a position setpoint signal applied to the control circuit and as a function of signals delivered by the angular position sensor, and the control circuit arranged to determine an opposing torque value as a function of the signals delivered by the two angular position sensors and as a function of a twisting stiffness of the deformable structure;
wherein the gearbox comprises a plurality of speed-reducing stages each stage comprising a pair of gears, the gears being mounted to rotate on two parallel axes of rotation, and wherein said motor comprising a rotor cage, said actuator is provided with a brake lining and with an electromagnetic field winding which is able to engage or disengage said brake lining against said rotary cage, and
wherein the deformable structure comprises a helical spring, two parallel plates connected to the ends of the helical spring, a first finger connecting the two parallel plates and the helical spring to the gearbox, and a second finger connecting the two parallel plates and the helical spring to the outlet shaft of the actuator.

2. An actuator according to claim 1, in which the speed-reducing gearbox comprises at least three speed-reducing modules or stages, wherein at least two speed-reducing stages presenting an identical reduction ratio.

3. An actuator according to claim 1, in which the gears are mounted to rotate about only two axes of rotation, wherein the axes are mutually parallel, and one of the two axes coincides with the axis of the outlet shaft.

4. An actuator according to claim 1, in which the two angular position sensors are magnetic sensors and include said first angular position sensor that is responsive to the angular position of the outlet shaft.

5. An actuator according to claim 1, in which the two angular position sensors include at least a portion of a magnetized rotary ring and a stationary sensor responsive to variations in the magnetization of the magnetized ring.

6. An actuator according to claim 5, in which each magnetized ring has two circular or circularly arcuate tracks that are concentric, each having several tens of north poles alternating with south poles, the two tracks being angularly offset, and the sensor responsive to variations in magnetization is a Hall effect sensor.

7. An actuator according to claim 1, further comprising a weakened structure forming a mechanical "fuse" for interrupting torque transmission between the motor and the outlet shaft when the opposing torque reaches a determined value, the weakened structure being interposed between the angular position sensor of the outlet shaft and the deformable structure that is deformable in twisting.

8. An actuator according to claim 1, further comprising an electromagnetic brake incorporated in the motor.

9. An actuator according to claim 1, further comprising an electromagnetic clutch interposed between the speed-reducing gearbox and the deformable structure that is deformable in twisting.

10. An actuator according to claim 1, further comprising an electromagnetic clutch interposed between two stages of the speed-reducing gearbox.

11. An actuator comprising:
an auto-synchronous rotary electric motor;
a reversible speed-reducing gearbox coupled to the motor to be driven in rotation thereby;
an outlet shaft coupled to the speed-reducing gearbox to be driven in rotation thereby;
a member responsive to the opposing torque transmitted by the outlet shaft, the member being interposed between and coupled to rotate with the outlet shaft and the speed-reducing gearbox, the member comprising a deformable structure that is deformable by twisting;
two angular position sensors responsive to the angular position of the deformable structure and disposed at opposite ends of the deformable structure, the first angular position sensor responsive to the angular position of the outlet shaft; and
a control circuit connected to the two angular position sensors and to the motor, said circuit delivering a motor power supply signal that varies as a function of a position setpoint signal applied to the control circuit and as a function of signals delivered by the angular position sensor, and the control circuit arranged to determine an opposing torque value as a function of the signals delivered by the two angular position sensors and as a function of the twisting stiffness of the deformable structure;
wherein the gearbox comprises a plurality of speed-reducing stages each stage comprising a pair of gears, the gears being mounted to rotate on two parallel axes of rotation, and wherein said motor comprising a rotor cage, said actuator is provided with a brake lining and with an electromagnetic field winding which is able to engage or disengage said brake lining against said rotary cage, a weakened structure forming a mechanical fuse for interrupting torque transmission between the motor and the outlet shaft when the opposing torque reaches a determined value, the weakened structure being interposed between the angular position sensor of the outlet shaft and the deformable structure that is deformable in twisting.

* * * * *